Nov. 3, 1925.  1,559,642
H. NYQUIST
SIGNALING WITH PHASE REVERSALS
Filed Aug. 28, 1923   3 Sheets-Sheet 1

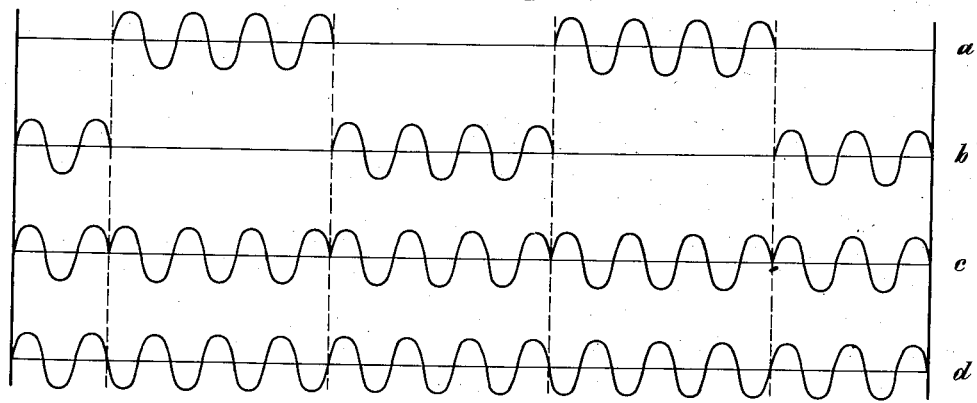

Curve a represents letter "T" when current in line corresponds to marking.
Curve b represents letter "T" when current in line corresponds to spacing.
Curve c represents letter "T" when signals are formed by reversing circuit.
Curve d represents a sine wave when the line is not reversed.
By combining Curves c and d, Curves like a and b may be obtained having amplitudes *twice as great* as a and b.

Fig. 1

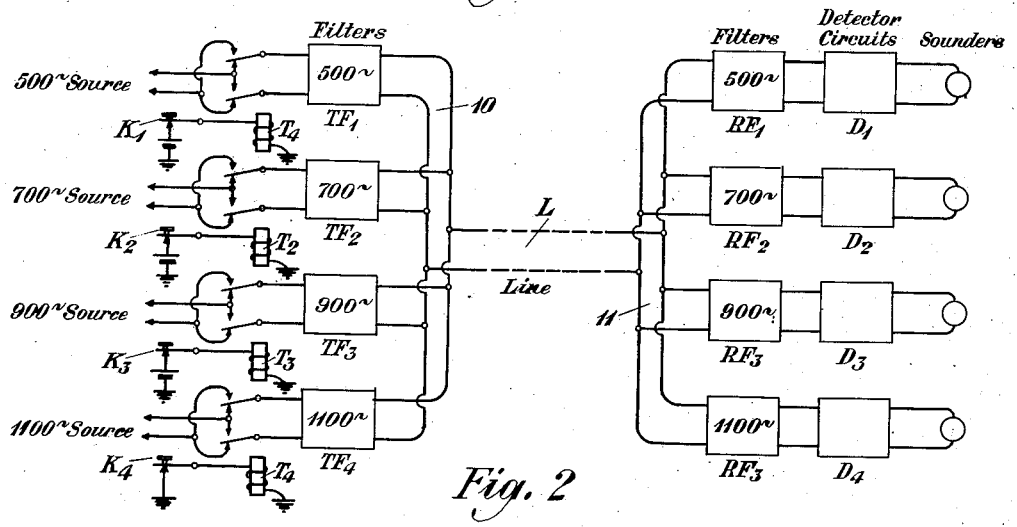

Fig. 2

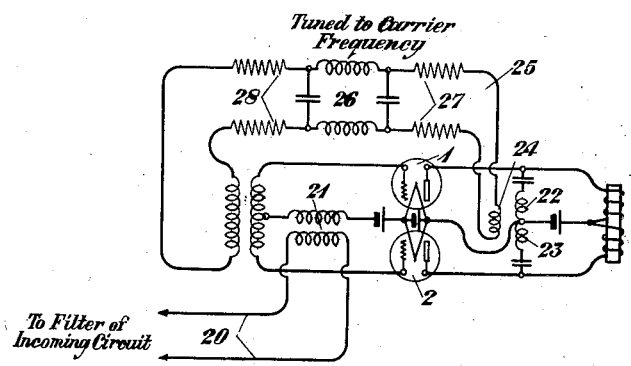

Fig. 3

INVENTOR
H. Nyquist
BY
ATTORNEY

Nov. 3, 1925.
H. NYQUIST
1,559,642

SIGNALING WITH PHASE REVERSALS

Filed Aug. 28, 1923   3 Sheets-Sheet 2

INVENTOR
H. Nyquist
BY
ATTORNEY

Nov. 3, 1925.  
H. NYQUIST  
1,559,642  
SIGNALING WITH PHASE REVERSALS  
Filed Aug. 28, 1923    3 Sheets-Sheet 3

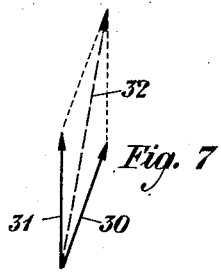
Fig. 7

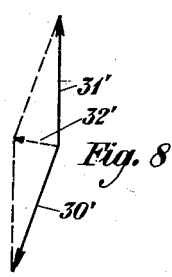
Fig. 8

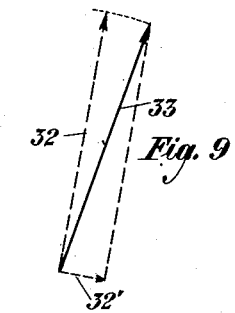
Fig. 9

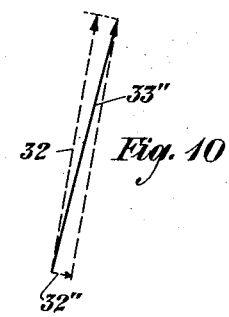
Fig. 10

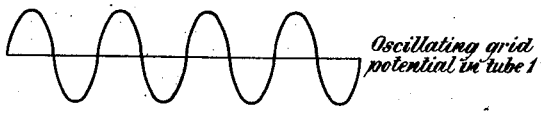
Fig. 11 — Oscillating grid potential in tube 1

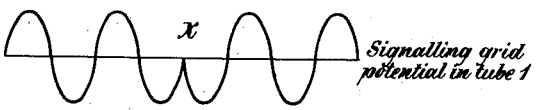
Fig. 12 — Signalling grid potential in tube 1

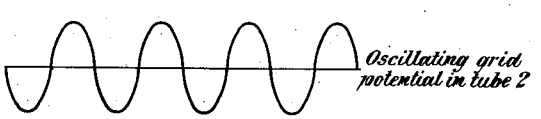
Fig. 13 — Combined grid potential in tube 1

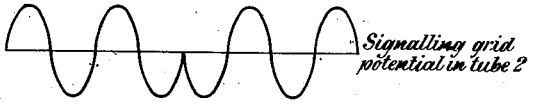
Fig. 14 — Oscillating grid potential in tube 2

Fig. 15 — Signalling grid potential in tube 2

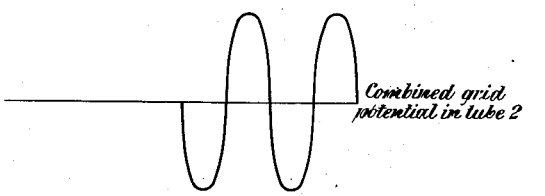
Fig. 16 — Combined grid potential in tube 2

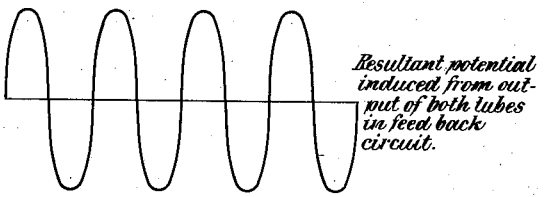
Fig. 17 — Resultant potential induced from output of both tubes in feed back circuit.

INVENTOR  
H. Nyquist  
BY  
ATTORNEY

Patented Nov. 3, 1925.

1,559,642

UNITED STATES PATENT OFFICE.

HARRY NYQUIST, OF ELMHURST, NEW YORK, ASSIGNOR TO AMERICAN TELEPHONE AND TELEGRAPH COMPANY, A CORPORATION OF NEW YORK.

SIGNALING WITH PHASE REVERSALS.

Application filed August 28, 1923. Serial No. 659,755.

*To all whom it may concern:*

Be it known that I, HARRY NYQUIST, residing at Elmhurst, in the county of Queens and State of New York, have invented certain Improvements in Signaling with Phase Reversals, of which the following is a specification.

This invention relates to the art of signaling, and more particularly to the transmission of telegraph signals.

It is one of the objects of the present invention to provide a telegraph system having one or more channels transmitting over the same circuit, the channels being so arranged that by the transmission of an alternating current of given magnitude, a signal response of greater amplitude will be produced. Another object of the invention is to provide a circuit of the type above described, in which the effect of foreign interference will be reduced. Another object of the invention is to provide a multiplex telegraph system so arranged that the mutual interference between different channels will be a minimum. A still further object of the invention is to provide a telegraph system in which the biasing effect of the received signals caused by variations in the transmission equivalent of the circuit will be practically eliminated.

Figure 4:
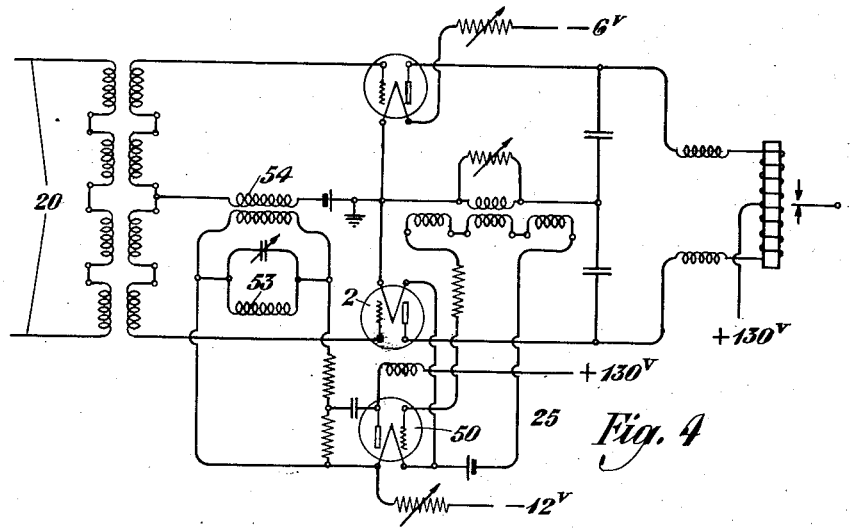
Figure 5:
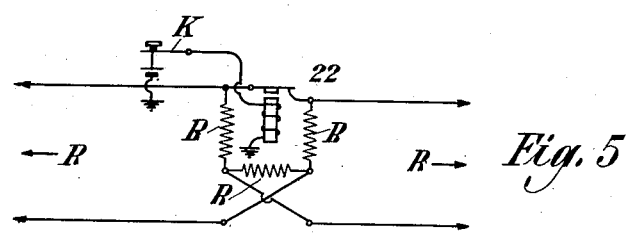
Figure 6:
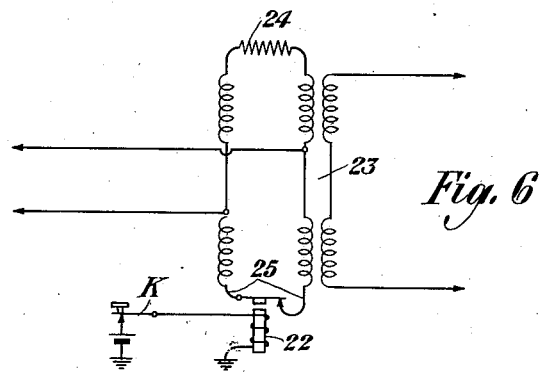

These objects, together with other objects of the invention, are accomplished by transmitting an alternating current of constant frequency and amplitude and by reversing the phase of the transmitted current in response to the marking and spacing signals. At the receiving station, the transmitted current will be combined with another current of equal amplitude and of the same frequency but with its phase constant. While, in general, this controlling current may be either generated at the transmitting station and transmitted to the receiving station, or generated at the receiving station under the control of the current source at the transmitting station, the specific embodiment of the invention herein disclosed illustrates only the latter of these methods The invention may now be more fully understood from the following detailed description thereof when read in connection with the accompanying drawings, in which Figure 1 is a series of curves illustrating the principles by which signals are formed in accordance with the present invention; Fig. 2 is a schematic circuit arrangement showing the apparatus to be used in practicing the invention; Figs. 3 and 4 are circuit arrangements of receiving elements employed in connection with the invention; Figs. 5 and 6 are circuits showing forms of transmitters to be used in connection with the invention; Figs. 7, 8, 9 and 10 are vector diagrams illustrating how the phase of the locally generated control current is determined by the transmitted signaling current in Figs. 3 and 4, while Figs. 11 to 17, inclusive, are curves illustrating the operation of the receiving circuits of Figs. 3 and 4.

Referring to Fig. 1, the curve designated *a* illustrates the current condition in the line of an alternating current telegraph system in which the marking signal is produced by transmitting current in the line and the spacing signal corresponds to the no-current condition of the line, the particular signal illustrated being the letter "I". Curve *b* represents the same letter when current in the line corresponds to the marking condition. The curve designated *c* represents the same letter formed in accordance with the present invention by simply reversing the phase without alternating the magnitude of the current. It will be seen that if a signaling wave such as is illustrated by the curve *c* is combined at the receiving end with the simple sine wave of the same frequency and constant amplitude as shown by the curve marked *d*, the resultant wave will be identical either with curve *a* or *b*, depending upon whether the constant sine wave be made to correspond in phase to the marking condition or the spacing condition of the signal wave. Inasmuch as the received signal is the result of two waves *c* and *d*, the signal will have an amplitude twice as great as the signal produced by waves such as shown at *a* or *b*. A signal wave such as that illustrated at *c* will be advantageous (provided a wave similar to *d* can be supplied at the receiving end) either from the standpoint of producing a stronger signal at the receiving station, or from the point of view of obtaining as strong a signal as can be at present attained, but with a line current only half as great as that required for signaling methods of the prior art.

Fig. 2 illustrates schematically the apparatus necessary where the present invention is applied to a multiplex carrier telegraph system. In this figure, L designates a transmission line having at the transmitting end four transmitting channels and at the receiving end four corresponding receiving channels. The number of channels assumed is for purposes of illustration only and in practice it will be understood that a greater or smaller number of channels may be employed as desired, the principle of the invention being to a certain extent the same whether a single channel is used or whether several channels are used. In connection with each transmitting channel, a suitable source of carrier current is provided, the sources in the case illustrated having assigned to them frequencies of 500, 700, 900 and 1100 cycles, respectively. Each source is connected through the contacts of a pole changing relay such as $T_1$, $T_2$, $T_3$, etc., to a filter or other selective device $TF_1$, $TF_2$, $TF_3$, etc., each filter being selective of the particular frequency assigned to a given channel. The output side of each filter is connected to common bus-bars 10 connected with the line L. At the receiving station, the line is associated with similar bus-bars 11 from which the receiving channels are branched through filters such as $RF_1$, $RF_2$, $RF_3$, etc., each filter being selective of the particular frequency assigned to its channel. Detecting and translating circuits illustrated schematically at $D_1$, $D_2$, $D_3$, etc., are connected to the output sides of the receiving filters. These detecting and translating circuits are of a type which will be described in more detail hereinafter.

In the arrangement shown in Fig. 2, the control frequency $d$ is not transmitted with the signaling wave $c$ but is supplied at the receiving station in connection with the detecting apparatus. The transmitting apparatus, it will be observed, is identical with the usual arrangement for carrier telegraph transmission except for the fact that a reversing arrangement is introduced for producing phase reversals in the transmitted wave instead of the ordinary arrangement for opening and shortening the transmitting circuit. By operating the transmitting key such as $K_1$, $K_2$, $K_3$, etc., the circuit of the pole changer may be opened and closed to produce reversals in the phase of the wave supplied from each carrier source so that the signaling wave for each channel will be substantially of the form shown at $c$ of Fig. 1.

For the purpose of simplicity of illustration, the signaling mechanism for producing the current reversals in the signaling frequencies applied to the transmission circuit are shown as being simple pole changers such as $T_1$, $T_2$, etc. Simple pole changers of this type are not, however, well adapted for producing the phase reversals in practice for the reason that a certain amount of time must elapse for the armature of the pole changer to pass from one contact to the other. During this time there will be a hiatus during which no current will be on the line and there will not actually be a sharp reversal from one phase to the other. Accordingly, it is preferred that some arrangement such as is illustrated in Fig. 5 be utilized for producing the phase reversals.

Fig. 5 illustrates a bridge arrangement comprising three arms, each of resistance R, and a fourth arm including the contact of a relay 22, whereby when the contact is closed, the resistance of the fourth arm will be zero, and when it is opened, the resistance will be infinite. Circuit connections extend from two opposite corners of the bridge to the carrier supply source (not illustrated) and circuit connections from the other two corners of the bridge extend through suitable apparatus (not illustrated in Fig. 5) to the signaling line. Preferably, the impedance looking towards the source and looking towards the signaling line should have the same value R as the arms of the bridge. It will be obvious from this circuit arrangement that if the key K controlling the circuit of the relay 22 is closed, so that the fourth arm of the bridge is of zero resistance, the bridge will be unbalanced to transmit current of a definite amplitude to the line, while if the key is opened, so that the contact in the fourth arm of the bridge is opened, the bridge will be unbalanced in the opposite sense, thereby causing a current of equal amplitude to flow in the opposite direction. In the case of an alternating current supply, it will be obvious that this will produce a change in phase of 180° in current supplied to the line. Since this change in the phase is instantaneous upon the making or breaking of the contact, there will be no hiatus between reversals.

A modified arrangement is illustrated in Fig. 6. In this figure, a balancing arrangement comprising a hybrid coil 23 and a balancing resistance or network 24 and a circuit 25 is provided. The current supply may be connected, for example, to the midpoints of the windings of the hybrid coil, the circuit to be supplied being in turn connected to the secondary of the hybrid coil, although the circuit will work equally well if the current source is connected to the secondary and the circuit to be supplied connected to the midpoints of the hybrid coil. If the impedance of the circuit 25 be made just equal to that of the network 24, it will be apparent that no current will be transmitted from the source to the circuit to be supplied. The circuit 25, however, contains the contact of a relay 22 and when the contact of the relay is closed, the circuit 25 has zero resistance, while with the contact open, the circuit 25 has infinite resistance. In the one case, the circuit will be unbalanced in one direction, and in the other case, the circuit will be unbalanced in the opposite direction, so that by manipulating the key K to open and close the contact of the relay 22, reversals in phase of the alternating current supplied will occur, and these reversals will occur instantly upon the making or breaking of the circuit.

As has already been stated, some arrangement must be provided whereby a continuous control wave of the same frequency as the signaling wave and of constant amplitude, but without phase reversals, may be generated and combined with the signaling wave to produce at the receiving station a wave of the type shown by either curve $a$ or curve $b$ of Fig. 1. In accordance with the present invention, it is proposed to generate this wave at the receiving station under the control of the signaling wave.

Fig. 3 illustrates a circuit arrangement whereby the vacuum tube detector may be used for generating the control wave locally. The arrangement comprises a duplex vacuum tube detector including the vacuum tubes 1 and 2 having balanced input and output circuits. The incoming signal is brought in by way of the circuit 20 and applied to the common path of the balanced input circuit through a transformer 21. The output circuit includes, in addition to the polar relay having a winding in each half of the output circuit, a special transformer having primary windings 22 and 23 and a secondary winding 24. The secondary winding is included in a feed-back circuit 25, the feed-back circuit also including a tuned circuit 26 having resistance elements 27 and 28 arranged upon either side thereof as illustrated.

It will be apparent that the arrangement consists substantially of an oscillating circuit which is arranged to oscillate normally at a frequency very close to the carrier frequency. Inasmuch as the oscillations which are normally generated by the circuit independently of the incoming signal currents must be transmitted through the vacuum tubes together with the signal currents when the signal currents are being received, it is desirable to keep the amplitude of the locally generated currents within certain limits in order not to "crowd" the tube by impressing too much current upon it. To avoid crowding of the detector tubes, the transformer arrangement comprising windings 22, 23 and 24 is so chosen as to work at or near saturation, thereby limiting the amplitude of the current components transmitted from the output circuit to the feed-back connection 25. As a result, the oscillations never build up to any great values, but only build up to values limited by the transformer.

The tuned circuit 26 provided in the feed-back arrangement serves two purposes. In the first place, it determines the frequency at which the arrangement will normally oscillate, and secondly, it eliminates the harmonics which are introduced in the feedback connection by means of the current limiting properties of the transformer comprising windings 22, 23 and 24. The four resistance elements designated 27 and 28, which are arranged upon either side of the tuned circuit, should be of great magnitude in order to obtain sharpness of tuning. The effect of the resistance to sharpen the tuning will be apparent when it is considered that if the resistance were of zero value, the condensers of the tuned circuit 26 would be short circuited and no tuning effect whatever would be obtained, while if the resistance were of infinite value, the tuned circuit would in effect function independently of the circuits connected to it and would oscillate sharply at its own frequency.

It will, of course, be apparent that it is not practicable to arrange the oscillating circuit so that oscillations independent of the signaling frequencies can be produced locally of exactly the same frequency as the signaling source. The circuit is so arranged, however, that the oscillations generated will swing from the natural period of the oscillating circuit to the incoming signal frequency transmitted from the circuit 20 as soon as the signaling frequency is applied.

It is, of course, a well-known phenomenon that when two alternators are connected into the same circuit and operate at substantially the same frequency, they will tend to approach each the frequency of the other and to operate together. The same thing will hold true in the case of a simple vacuum tube oscillator. That is to say, if a frequency transmitted from a distant point be applied to the circuit of a vacuum tube oscillator, the natural frequency of the oscillator will be shifted to the incoming frequency, if the natural frequency and the incoming frequency are normally not far apart. This may be readily understood from the vector diagram of Fig. 7. Assuming in this figure that the vector 30 represents the phase and instantaneous amplitude of the wave generated by the oscillator, and that vector 31 represents the phase and instantaneous amplitude of a received wave of substantially the same frequency, the resultant wave upon the grid of the oscillator will be represented by the dotted vector 32 and it will be noted that the phase of the resultant wave is intermediate between that of the normally generated wave and the received wave. Consequently, the next oscillation of the oscillator fed into the feed-back circuit will have the same phase as the vector 32 and will have approached the phase of the received wave 31. Each successive oscillation will result in the wave approaching closer to the phase of the incoming wave 31 so that synchronism will result.

While this phenomenon is sufficiently obvious as applied to a single tube oscillator, it does not necessarily follow that a duplex oscillator will shift into synchronism with a received oscillation. For example, let us assume that Fig. 7 illustrates the situation with respect to tube 1. With respect to tube 2, however, the result is somewhat different, as illustrated in Fig. 8. Here 30' represents the instantaneous amplitude and phase of the locally generated oscillation applied to the grid of the lower tube. 31' represents the instantaneous amplitude and phase of the received wave. It will be observed that the locally generated wave is 180° out of phase with the corresponding component in Fig. 7, and consequently, the two components in the lower tube tend to a large extent to neutralize each other, producing a resultant wave 32' of relatively small amplitude and 90° out of phase with the component 32 of the upper tube. If now, the resultant of the vectors 32 and 32' be obtained as illustrated by the vector diagram of Fig. 9, it will be seen that the resultant wave 33 will be in phase with the locally generated wave 30. In this connection it should be noted that in the vector diagram of Fig. 9, the vector 32' is applied 180° out of phase with the corresponding vector in Fig. 8. This is for the reason that one of the windings 22 or 23 of the output transformer must be poled oppositely to the other in order that the components may be series-aiding in the secondary winding 24. The wave fed back to produce the succeeding oscillation will be in phase with and proportional to the vector 33. There is consequently no tendency of the balanced tube oscillator to shift in frequency so as to synchronize with a received wave if the oscillating tubes have a straight line characteristic so that the amplification is the same regardless of the amplitude of the wave.

Fortunately, however, the tubes being used for detecting purposes do not have straight characteristics but are arranged for normal working upon the non-linear part of the curve. The result is that large grid potentials are amplified to a greater degree than smaller grid potentials. The effect is illustrated by the vector diagram of Fig. 10. Here the component 32" is shown as being smaller than the corresponding component 32' in Fig. 9 to take into account the fact that in the output circuit a smaller degree of amplification will result for the smaller grid potential applied to the lower tube as compared with the large grid potential applied to tube 1. The resultant wave will have the instantaneous amplitude and phase indicated at 33". It will be observed that this wave, which corresponds to the wave fed back into the input circuit, approaches the phase of the vector 32, and consequently, tends to approach synchronism with the incoming wave 31 of Fig. 7. It will be evident, therefore, that as successive oscillations take place, the generated oscillations will finally coincide with the received oscillations.

Having shown that the oscillations generated will be of the same frequency and in phase with the received oscillations so long as the received oscillations are continuous, it remains to be shown that the generated oscillations, having once stepped into phase with the received oscillations, will not reverse in phase as the received signaling currents reverse in phase. It is necessary that the locally generated oscillations should not reverse in phase in order that they may assume the character of the wave $d$ of Fig. 1. That such reversal in phase will not take place once the oscillations are in synchronism will be clear from the curves shown in Figs. 11 to 17, inclusive.

In Fig. 11 the curve illustrated represents the potential applied to the grid of tube 1 as the result of the locally generated oscillations, assuming that the locally generated oscillations are in synchronism with the received signaling wave. Suppose now a signaling wave is also superposed upon the grid from the circuit 20 as illustrated by the curve 12, a reversal in phase taking place at the point $x$. The resultant potential upon the grid will be illustrated by the curve of Fig. 13 in the case where the amplitude of the signaling potential and the local oscillating potential is the same. It will be noted that the resultant potential on the grid is twice the amplitude of the signaling potential during the marking period, while during the spacing period, the signaling component and the locally generated component just neutralize each other. In the case of tube 2, on the other hand, the oscillating potential upon the grid will be as illustrated in the curve of Fig. 14, which, it will be observed, is opposite in phase to the corresponding curve of Fig. 11. The signaling potential upon the grid of tube 2 will be exactly in phase with that applied to the grid of tube 1, however, as illustrated in Fig. 15. The resultant potential upon the grid of tube 1 will be as illustrated by the curve of Fig. 16, in which a potential of double amplitude appears upon the grid during the spacing interval, the marking potential, however, just neutralizing the locally generated potential during the marking period.

It will be obvious that components will appear in the windings 22 and 23 corresponding to the curves of Figs. 13 and 16, and disregarding the components resulting from distortion during the detecting operation, a potential proportional to the combined curves of Figs. 13 and 16 will appear in the feed-back circuit 25. Bearing in mind that one of the windings 22 or 23 is poled oppositely with respect to the other in order that the effects in the two windings may be added with respect to each other in the winding 24, it will be apparent that the wave of Fig. 17 will be obtained in the circuit 25 by combining the waves of Figs. 13 and 16. The wave of the latter figure is shown reversed in Fig. 17 because of the poling of the windings. It will be apparent at once that the wave of Fig. 17, which represents the wave in the feed-back circuit, is in synchronism with the received signaling wave but does not reverse in phase when the signaling wave reverses. Consequently, the oscillations generated locally, once set into synchronism, will continue steadily without phase reversals so long as the continuous signaling wave of Fig. 3 is applied to the detector circuit.

Having demonstrated that the detecting circuit arrangement illustrated in Fig. 3 will produce a locally generated wave of constant amplitude in synchronism with the received signaling wave, it will be readily apparent how the locally generated wave may be combined with the signaling wave to operate the polar relay. Fig. 13 may be taken to represent the effect upon the grid of tube 1 during successive marking and spacing intervals. Similarly, Fig. 16 may be taken to represent the corresponding condition upon the grid of tube 2. Obviously, due to the non-linear characteristic of the tubes, a direct current component or pulse will be detected and flow through the upper winding of the polar relay corresponding to the series of oscillations received during the marking interval, no current, however, flowing through the lower winding in the output circuit of the tube 2. During the spacing interval, a detected pulse of direct current corresponding to the series of waves of Fig. 16 will occur in the lower winding but no current will flow in the upper winding of the polar relay. Consequently, the armature of the polar relay will shift back and forth with and in phase with the received signal. In short, the polar relay operates in much the same way as if it were receiving reversals of direct current.

It will be obvious that when the apparatus is once set into operation it will keep the right phase relations permanently. When starting the oscillator at the beginning of the day, however, it may very easily happen that the oscillation voltage will be 180° out of phase with the desired incoming voltage and consequently, the signals will be reversed. To obviate this disadvantage it will be desirable to provide means for reversing the two contacts of the polar relay or else to provide some means for reversing some other suitable element in the circuit or for reversing the connections for applying the signaling voltage to the detector.

It will be apparent from the foregoing that by arranging the circuits of the detectors $D_1$, $D_2$, etc., in Fig. 2 as illustrated in Fig. 3, the control current may be generated locally and maintained in phase with the received signaling current notwithstanding the current reversals in the latter. A modified arrangement for producing the same result as that produced by Fig. 3, is illustrated in Fig. 4. In this case the limitation of the current in the feed-back circuit is obtained by providing a distorting tube 50 in the feed-back circuit 25. The distorting tube has the usual high resistance 52 in its input circuit for cutting off the tops of the waves and the output circuit is tuned as indicated at 53 to eliminate the harmonics resulting from distortion and determine the frequency of the oscillating circuit. The feed-back circuit in this case is coupled to the common path of the duplex output circuit through a transformer 51 (which in this case need not be worked at saturation) and the coupling of the feed-back connection to the input circuits is effected through the transformer 54 in the common path of the duplex circuit. The incoming circuit 20 from the signaling line is applied to the input circuit of the detector in such a manner as to produce opposite potentials upon the grids of the two detecting tubes 1 and 2. It will thus be seen that the connections for the signaling potentials and for the control potentials are reversed in the arrangement of Fig. 4 with respect to the arrangement shown in Fig. 3. The operation will, in general, be similar to that described in connection with Fig. 3 and further discussion thereof is unnecessary.

It will be obvious that the general principles herein disclosed may be embodied in many other organizations widely different from those illustrated without departing from the spirit of the invention as defined in the following claims.

What is claimed is:

1. The method of signaling, which consists in transmitting a wave of constant amplitude and frequency but reversed in phase at intervals to indicate signals, producing at the receiving station under the control of said wave a wave of similar amplitude and frequency without phase reversals, and combining the two waves at the receiving station.

2. The method of signaling, which consists in generating a wave of constant amplitude and frequency, reversing the phase of said wave at intervals, transmitting the wave with its phase reversals to a receiving station, generating at the receiving station under the control of said first mentioned wave a wave of similar amplitude and frequency but unreversed in phase, and combining the two waves to produce a signal.

3. The method of signaling, which consists in transmitting a wave of substantially constant amplitude and frequency but reversed in phase at intervals to indicate signals, producing at a receiving station oscillations of substantially the same frequency as the signaling wave, impressing a portion of the energy of the signaling wave upon the locally generated oscillations to combine therewith to produce oscillations of the same frequency as the signaling wave, and detecting a signal from the combined locally generated and received oscillations.

4. In a signaling system, means to transmit a wave of constant amplitude and frequency, means to produce phase reversals in said wave to indicate signals, means at a receiving station to produce under the control of said wave a wave of similar amplitude and frequency without phase reversals, and means for combining the two waves at the receiving station.

5. In a signaling system, means at a transmitting station for generating a wave of constant amplitude and frequency, means for reversing the phase of said wave at intervals to indicate signals, means to transmit the wave with its phase reversals to a receiving station, means at the receiving station to generate under the control of said first mentioned wave a wave of similar amplitude and frequency but unreversed in phase, and means at the receiving station to combine the two waves to produce a signal.

6. In a signaling system, means for transmitting a wave of substantially constant frequency and amplitude but reversed in phase at intervals to indicate signals, means at a receiving station for generating oscillations of substantially the same frequency as the signaling wave, means for impressing a portion of the energy of the signaling wave upon the locally generated oscillations to combine therewith to produce oscillations of the same frequency as the signaling wave, and means to combine the oscillations thus produced with the received wave to detect a signal.

7. In a signaling system, means to transmit a wave of substantially constant frequency and amplitude but reversed in phase at intervals to indicate signals, an oscillation generator at a receiving station having its circuit so timed as to generate oscillations of substantially the same frequency as the signaling wave, means to apply a portion of the energy of the signaling wave to said oscillator so that said oscillator will oscillate at the same frequency as the signaling wave, and means to combine the oscillations thus generated with the signaling wave to produce a signal.

8. In a signaling system, means to transmit a wave of substantially constant frequency and amplitude but reversed in phase at intervals to indicate signals, an oscillation generator at a receiving station having its circuit so timed as to generate oscillations of substantially the same frequency as the signaling wave, means to apply a portion of the energy of the signaling wave to said oscillator so that said oscillator will oscillate at the same frequency as the signaling wave, means associated with said oscillator to prevent the oscillations generated thereby from changing in phase when the signaling waves applied thereto are reversed in phase, and means to detect a signal from the combined generated oscillations and signaling waves.

9. In a signaling system, means to transmit a wave of substantially constant amplitude and frequency but reversed in phase at intervals to indicate signals, a duplex translating device at the receiving station, a feed-back connection associated therewith so that said device will normally oscillate at substantially the frequency of the transmitted wave, means whereby the transmitted wave may be impressed upon said duplex translating device to cause the same to produce oscillations of the same frequency as the transmitted wave, and means whereby impulses of the same phase are impressed upon said feed-back circuit in response to impulses of opposite phase impressed upon said translating device, whereby the oscillations generated by said translating device will not change in phase when the transmitted wave is reversed in phase.

10. In a signaling system, a duplex translating device having balanced input and output circuits, a feed-back connection for associating the output and input circuits, means to determine the normal frequency of said translating device, means to impress upon the input of said translating device waves of substantially constant amplitude and frequency but reversed in phase at intervals, means whereby in response to such waves said translating device will produce local oscillations of the same frequency as the impressed wave, means associated with the balanced output circuit of said translating device for impressing upon the feed-back connection impulses of the same phase in response to impulses of opposite phase applied to the input circuit, whereby the locally generated oscillations will not change in phase when the applied wave is reversed in phase.

11. In a signaling system, a duplex translating device comprising a pair of vacuum tubes, balanced input and output circuits associated with said tubes, a feed-back connection interconnecting the input and output circuits of said tubes, means to determine the normal frequency of said translating device, means to impress upon the input circuits of said vacuum tubes a wave of substantially constant amplitude and frequency but reversed in phase at intervals, means to cause said translating device to oscillate in response to said wave at the frequency of said wave, and means associated with the output circuits of said vacuum tube for producing effects of the same phase upon the feed-back connection in response to impulses of opposite phase applied to the input circuit.

In testimony whereof, I have signed my name to this specification this 27th day of August, 1923.

HARRY NYQUIST.